United States Patent
Hokuto et al.

(10) Patent No.: US 8,276,365 B2
(45) Date of Patent: Oct. 2, 2012

(54) CONTROL DEVICE AND CONTROL METHOD FOR INTERNAL COMBUSTION ENGINE

(75) Inventors: Hiroyuki Hokuto, Numazu (JP); Naoya Kaneko, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 302 days.

(21) Appl. No.: 12/664,406

(22) PCT Filed: Jun. 12, 2008

(86) PCT No.: PCT/IB2008/001515
§ 371 (c)(1),
(2), (4) Date: Dec. 14, 2009

(87) PCT Pub. No.: WO2008/152485
PCT Pub. Date: Dec. 18, 2008

(65) Prior Publication Data
US 2010/0162689 A1   Jul. 1, 2010

(30) Foreign Application Priority Data
Jun. 13, 2007 (JP) ................................ 2007-156663

(51) Int. Cl.
*F01N 3/00* (2006.01)
(52) U.S. Cl. ................ 60/280; 60/274; 60/285; 60/287; 60/299; 123/90.15; 123/90.19
(58) Field of Classification Search ............ 60/274, 60/280, 285, 287, 299; 123/90.11, 90.15, 123/90.19
See application file for complete search history.

(56) References Cited

U.S. PATENT DOCUMENTS

| | | | |
|---|---|---|---|
| 6,415,600 B1* | 7/2002 | Lejon | 60/280 |
| 6,438,956 B1* | 8/2002 | Olofsson | 60/605.1 |
| 6,595,183 B1 | 7/2003 | Olofsson | |
| 6,883,319 B2* | 4/2005 | Ekenberg | 60/602 |
| 7,219,634 B2* | 5/2007 | Hitomi et al. | 123/58.8 |
| 7,509,805 B2* | 3/2009 | Karlsson | 60/612 |
| 7,703,284 B2* | 4/2010 | Becker et al. | 60/612 |
| 7,992,541 B2* | 8/2011 | Petridis et al. | 123/347 |

FOREIGN PATENT DOCUMENTS

| | | |
|---|---|---|
| FR | 2 835 882 | 8/2003 |
| JP | 63-55326 | 3/1988 |
| JP | 10-89106 | 4/1998 |
| JP | 11-210449 | 8/1999 |
| JP | 11-294157 | 10/1999 |

(Continued)

*Primary Examiner* — Binh Q Tran
(74) *Attorney, Agent, or Firm* — Oblon, Spivak, McClelland, Maier & Neustadt, L.L.P.

(57) ABSTRACT

In a region where the engine load is less than a first predetermined value, only a second exhaust valve that opens and closes a second exhaust passageway that bypasses a turbine of a supercharger is opened. In a region where the engine load is greater than or equal to the first predetermined value and less than a second predetermined value, both the second exhaust valve and a first exhaust valve that opens and closes a first exhaust passageway that leads to the turbine are opened. In a region where the engine load is greater than or equal to the second predetermined value, only the first exhaust valve is opened. A predetermined value for the time of lean combustion is set lower than a predetermined value for the time of stoichiometric combustion.

17 Claims, 10 Drawing Sheets

FOREIGN PATENT DOCUMENTS

| | | |
|---|---|---|
| JP | 2002-526713 | 8/2002 |
| JP | 2002-527673 | 8/2002 |
| JP | 2004-92429 | 3/2004 |
| JP | 2006-177189 | 7/2006 |
| JP | 2007-046505 | 2/2007 |
| JP | 2007-100616 | 4/2007 |
| JP | 2007-113413 | 5/2007 |

* cited by examiner

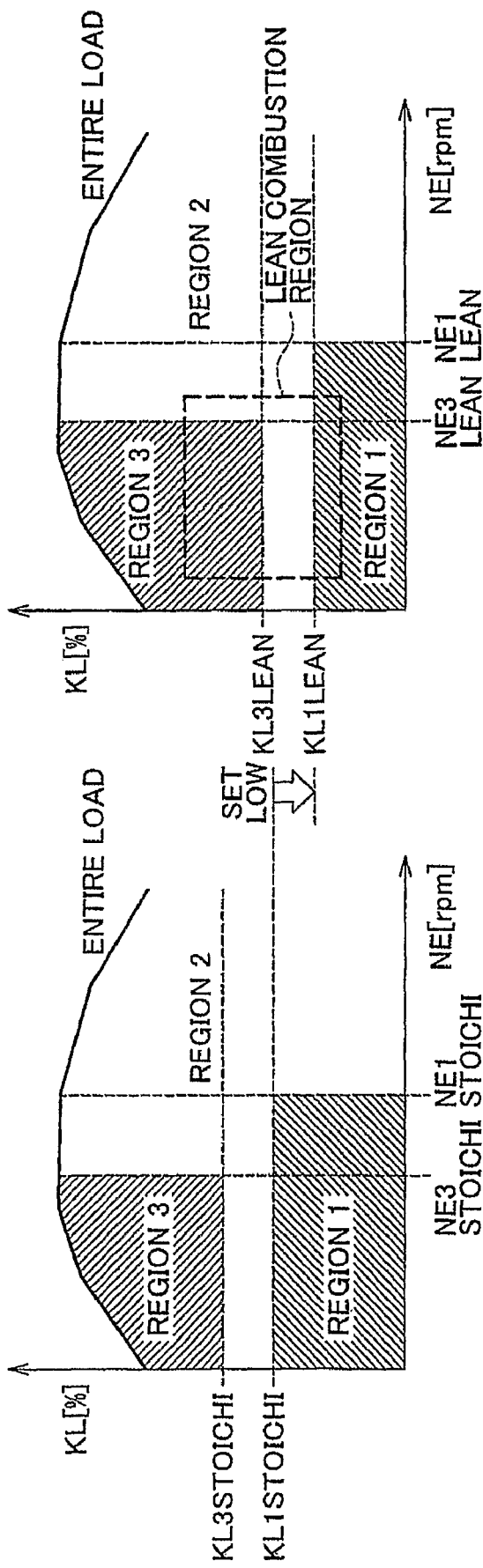

FIG. 3A REGION 1
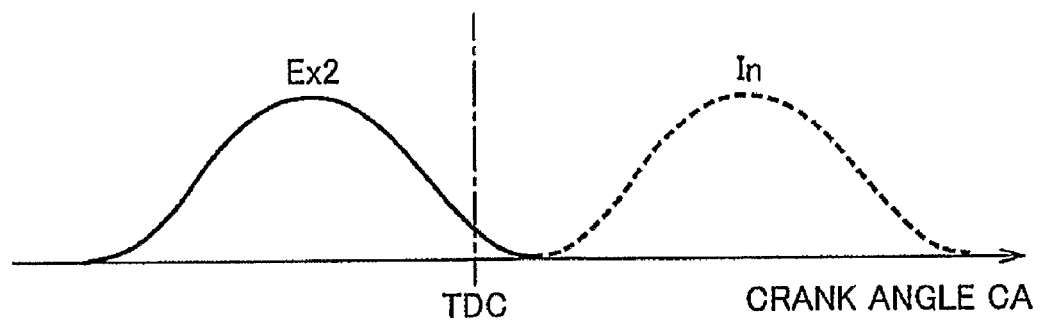
FIG. 3B REGION 2
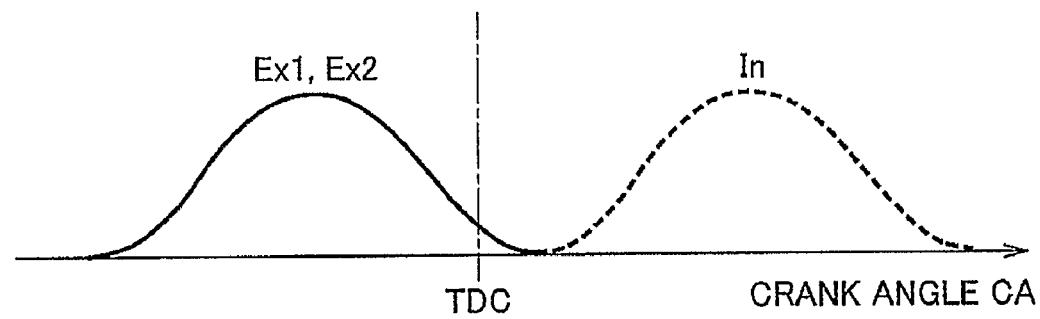
FIG. 3C REGION 3
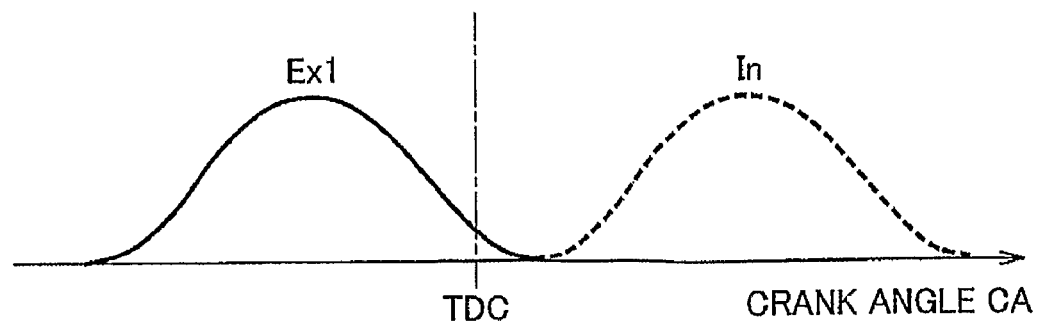

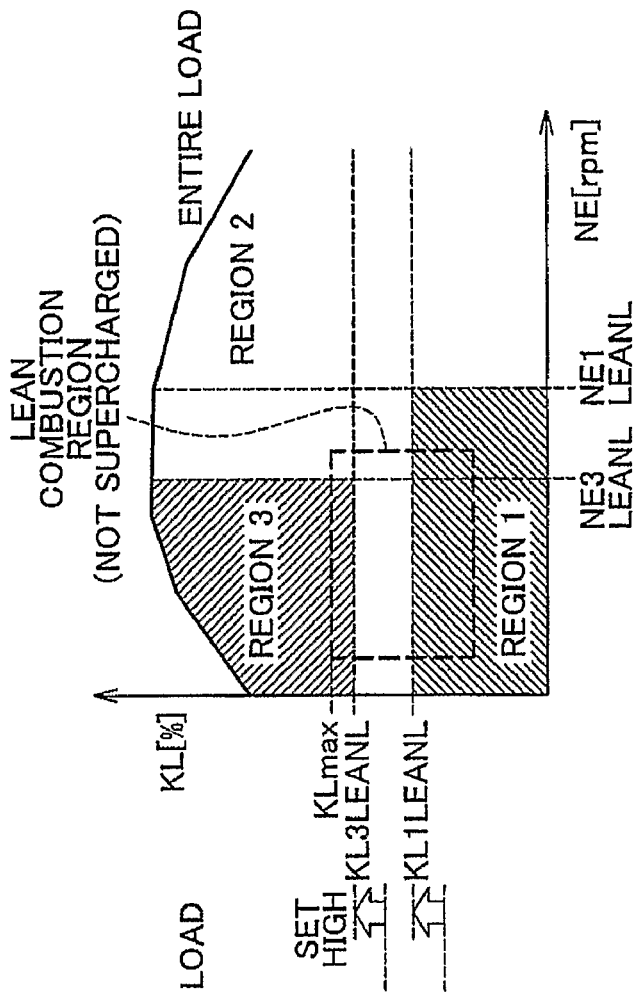
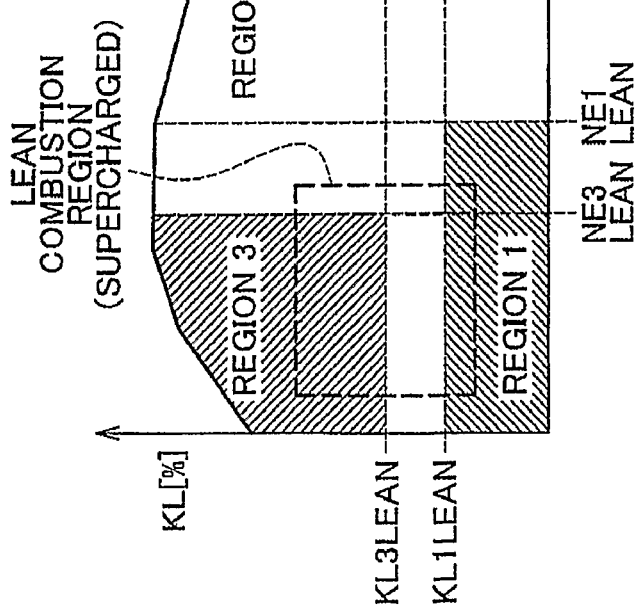

CONTROL DEVICE AND CONTROL METHOD FOR INTERNAL COMBUSTION ENGINE

BACKGROUND OF THE INVENTION

1. Field of the Invention

The invention relates to a control device and a control method for a turbocharger-equipped internal combustion engine, and more particularly to an exhaust valve control during lean combustion.

2. Description of the Related Art

There is a known device (independent exhaust type engine) that includes a first exhaust valve that opens and closes an exhaust passageway that leads to a turbine, and a second exhaust valve that opens and closes an exhaust passageway that does not lead to the turbine (see, e.g., Japanese Patent Application Publication No. 10-89106 (JP-A-10-89106)). According to this device, during a high-speed and high-load operation, the second exhaust valve that does not communicate with the turbine is opened at an earlier timing than the first exhaust valve that communicates with the turbine. This reduces the exhaust pumping loss, so that the output can be improved in a high-speed region.

During the lean combustion, the exhaust gas temperature becomes low, and therefore the work done by turbocharger becomes small, so that the charging pressure may sometimes become insufficient. Besides, because the catalyst bed temperature declines, the exhaust emission characteristic may sometimes deteriorate.

SUMMARY OF THE INVENTION

The invention provides a control device and a control method for an internal combustion engine capable of achieving sufficient charging pressure even during the lean combustion. The invention also provides a control device and a control method for an internal combustion engine capable of preventing the deterioration of the exhaust emission characteristic while achieving sufficiently high charging pressure during the lean combustion.

A first aspect of the invention is an internal combustion engine control device including: a turbocharger provided on an internal combustion engine; a first exhaust valve that opens and closes an exhaust port that communicates with a first exhaust passageway on which a turbine of the supercharger is provided; a second exhaust valve that opens and closes an exhaust port that communicates with a second exhaust passageway that bypasses the turbine; a catalyst disposed at a downstream side of a meeting point of the first exhaust passageway and the second exhaust passageway; an engine load acquisition device that acquires an engine load; and a control portion that opens only the second exhaust valve when the engine load is less than a first predetermined value, and that opens both the first and second exhaust valves when the engine load is greater than or equal to the first predetermined value and less than a second predetermined value, and that opens only the first exhaust valve when the engine load is greater than or equal to the second predetermined value, wherein the control portion sets the first predetermined value to be lower during a lean combustion than during a stoichiometric combustion.

In the first aspect of the invention, during a low-load state in which the engine load is less than the first predetermined value, only the second exhaust valve is opened. During such a low-load state, the supercharging efficiency is low, so that the supply of exhaust gas to the turbine is not likely to significantly raise the charging pressure. Therefore, the entire amount of exhaust gas is supplied directly to the catalyst without passing through the turbine, so that the decline of the catalyst bed temperature is restrained. Besides, in the case where the engine load is greater than or equal to the first predetermined value and less than the second predetermined value, the first exhaust valve and the second exhaust valve are both opened. As a result, the turbocharger can be preliminarily operated so as to improve the response of the turbocharger, and at the same time, sharp decline of the catalyst bed temperature can be restrained. Besides, during a high-load state, in which the engine load is greater than or equal to the second predetermined value, only the first exhaust valve is opened. In such a high-load state, the exhaust gas is entirely supplied to the turbine, so that sufficient charging pressure can be obtained. Incidentally, during the lean combustion, the exhaust gas temperature is relatively low so that the response of the turbocharger is likely to deteriorate, in comparison with during the stoichiometric combustion. Therefore, during the lean combustion, the first predetermined value of the engine load is set lower than during the stoichiometric combustion. That is, during the lean combustion, the engine operation region in which the operation of the turbocharger started is expanded to the low-load side. Therefore, during the lean combustion, the operation of the turbocharger is started at a lower-load side in comparison with during the stoichiometric combustion, so that the response of the turbocharger during the lean combustion can be heightened. Hence, even during the lean combustion, sufficient charging pressure can be obtained.

In the first aspect, during the lean combustion, the control portion may set the second predetermined value to be lower than during the stoichiometric combustion.

In this construction, during the lean combustion, the second predetermined value is set lower than during the stoichiometric combustion. That is, during the lean combustion, the region of engine operation state in which the entire amount of exhaust gas is supplied to the turbocharger is expanded to the low-load side. Then, during the lean combustion, the entire amount of exhaust gas is supplied to the turbocharger at a lower-load side, in comparison with during the stoichiometric combustion. Hence, during the lean combustion, the response of the turbocharger in a high-load region can be heightened, and sufficient charging pressure can be obtained.

When the lean combustion is being performed and a catalyst bed temperature is less than a reference value, the control portion may set the first predetermined value to be higher than when the lean combustion is being performed and the catalyst bed temperature is greater than or equal to the reference value.

In the foregoing construction, when the engine operation mode is the lean combustion and the catalyst bed temperature is less than the reference value, the first predetermined value is set higher than when the engine operation mode is the lean combustion and the catalyst bed temperature is greater than or equal to the reference value. Specifically, during the lean combustion, the turbocharger starts to be operated at a higher load side when the catalyst bed temperature is relatively low than when the catalyst bed temperature is relatively high. Then, in the case where the catalyst bed temperature is low during the lean combustion, the direct supply of the entire amount of exhaust gas to the catalyst without passage through the turbine can be performed up to a higher load side, so that the decline of the catalyst bed temperature can be prevented. Hence, during the lean combustion, deterioration of the exhaust emission characteristic can be prevented.

Furthermore, in the first aspect, when the lean combustion is being performed and the catalyst bed temperature is less than a reference value, the control portion may set the second predetermined value to be higher than when the lean combustion is being performed and the catalyst bed temperature is greater than or equal to the reference value.

In this construction, when the engine operation mode is the lean combustion and the catalyst bed temperature is less than the reference value, the second predetermined value is set higher than when the engine operation mode is the lean combustion and the catalyst bed temperature is greater than or. equal to the reference value. That is, during the lean combustion, the supply to the entire amount of exhaust gas to the turbine is performed at a higher load side in the case of relatively low catalyst bed temperature than in the case of relatively high catalyst bed temperature. Then, in the case where the catalyst bed temperature is relatively low during the lean combustion, the direct supply of a portion of the exhaust gas to the catalyst can be performed up to a higher load side, so that decline of the catalyst bed temperature can be prevented. Hence, during the lean combustion, the deterioration of the exhaust emission characteristic can be prevented while sufficient charging pressure is obtained.

Furthermore, when both the first and second exhaust valves are to be opened, the control portion may open the first exhaust valve and then opens the second exhaust valve.

In that case, the first exhaust valve is opened at a timing when the piston speed is the fastest, so that exhaust gas can be efficiently supplied to the first exhaust passageway. Hence, the work done by the turbocharger can be increased.

A second aspect of the invention is an internal combustion engine control device including: a turbocharger provided on an internal combustion engine; a first exhaust valve that opens and closes an exhaust port that communicates with a first exhaust passageway on which a turbine of the turbocharger is provided; a second exhaust valve that opens and closes an exhaust port that communicates with a second exhaust passageway that bypasses the turbine; a catalyst disposed at a downstream side of a meeting point of the first exhaust passageway and the second exhaust passageway; and a control portion that, during a lean combustion, brings the second exhaust valve to rest in a closed state, and sets an amount of valve overlap between the first exhaust valve and an intake valve to be less than a predetermined value.

The foregoing internal combustion engine control device may further include a catalyst bed temperature acquisition device that acquires a bed temperature of the catalyst, and the control portion may bring the second exhaust valve to rest in the closed state, and may set the amount of valve overlap between the first exhaust valve and the intake valve to be less than the predetermined value, when the lean combustion is being performed and the catalyst bed temperature is greater than or equal to a reference value.

In the foregoing construction, during the lean combustion, the second exhaust valve is brought to rest in a closed state, so that the entire amount of exhaust gas is supplied to the turbine. Furthermore, the amount of overlap between the first exhaust valve and the intake valve is set less than a predetermined value. This restrains the blow-through of fresh air to the first exhaust passageway, and therefore can prevent a rich shift of the air-fuel ratio. Therefore, during the lean combustion as well, a sufficient exhaust energy can be supplied, so that sufficient turbocharger pressure can be obtained.

In the foregoing construction, the control portion may set the amount of overlap between the first or second exhaust valve and the intake valve to be greater than or equal to the predetermined value, when the lean combustion is being performed and the catalyst bed temperature is less than the reference value.

This results in occurrence of the blow-through of fresh air into the first or second exhaust passageway. Then, the air-fuel ratio shifts toward a rich side, so that unburned fuel and fresh air can be reacted on the catalyst while the exhaust energy given to the turbocharger becomes less than in the foregoing construction. Hence, during the lean combustion, the catalyst bed temperature can be raised, so that deterioration of exhaust emission can be prevented.

Furthermore, the control portion may inject fuel during an expansion stroke of the internal combustion engine, when the lean combustion is being performed, and the catalyst bed temperature is less than the reference value, and a request value for raising the catalyst bed temperature is greater than or equal to a predetermined value.

As a result, a larger amount of unburned fuel is supplied to the catalyst than in the case where fuel is not injected during the expansion stroke. Therefore, the reaction between unburned fuel and fresh air on the catalyst is further accelerated, so that the catalyst bed temperature can be further raised.

Furthermore, when both the first and second exhaust valves are to be opened, the control portion may open the first exhaust valve, and then may open the second exhaust valve.

In the case, the first exhaust valve is opened at a timing when the piston speed is the fastest, so that the exhaust gas can be efficiently supplied to the first exhaust passageway. Hence, the work done by the turbocharger can be increased.

A third aspect of the invention relates to a control method for an internal combustion engine that includes a turbocharger, a first exhaust valve that opens and closes an exhaust port that communicates with a first exhaust passageway on which a turbine of the turbocharger is provided, a second exhaust valve that opens and closes an exhaust port that communicates with a second exhaust passageway that bypasses the turbine, and a catalyst disposed at a downstream side of a meeting point of the first exhaust passageway and the second exhaust passageway. The control method includes: setting a first region that is an operation region of the internal combustion engine in which only the second exhaust valve is opened, a second region that is an operation region of the internal combustion engine in which both the first and second exhaust valves are opened, and a third region that is an operation region of the internal combustion engine in which only the first exhaust valve is opened; calculating an engine rotation speed and an engine load; determining whether or not a lean combustion is being performed based on the engine rotation speed and the engine load; and setting a first predetermined value that is an upper-limit value of the first region or both the first predetermined value and a second predetermined value that is an upper-limit value of the second region to be lower when it is determined that the internal combustion engine is presently operated in the lean combustion than when it is determined that the internal combustion engine is presently operated in a stoichiometric combustion.

According to the third aspect of the invention, during the lean combustion, the operation region of engine operation state in which the operation of the turbocharger started is expanded to the low-load side. Therefore, during the lean combustion, the turbocharger starts to be operated at a lower load side, in comparison with during the stoichiometric combustion, so that the response of the turbocharger during the lean combustion can be heightened. Hence, during the lean combustion, too, sufficient charging pressure can be obtained.

A fourth aspect of the invention relates to a control method for an internal combustion engine that includes a turbocharger, a first exhaust valve that opens and closes an exhaust port that communicates with a first exhaust passageway on which a turbine of the turbocharger is provided, a second exhaust valve that opens and closes an exhaust port that communicates with a second exhaust passageway that bypasses the turbine, and a catalyst disposed at a downstream side of a meeting point of the first exhaust passageway and the second exhaust passageway. The control method includes: setting a first region that is an operation region of the internal combustion engine in which only the second exhaust valve is opened, a second region that is an operation region of the internal combustion engine in which both the first and second exhaust valves are opened, and a third region that is an operation region of the internal combustion engine in which only the first exhaust valve is opened; calculating an engine rotation speed and an engine load; determining whether or not a lean combustion is being performed based on the engine rotation speed and the engine load; detecting a bed temperature of the catalyst; and bringing the second exhaust valve to rest in a closed state and setting an amount of valve overlap between the first exhaust valve and an intake valve to be less than a predetermined value, when it is determined that the internal combustion engine is presently operated in a lean combustion and the catalyst bed temperature is greater than or equal to a reference value.

In the fourth aspect of the invention, during the lean combustion, the second exhaust valve is brought to rest in the closed state, so that the entire amount of exhaust gas is supplied to the turbine. Furthermore the amount of overlap between the first exhaust valve and the intake valve is set less than the predetermined value. This restrains the blow-through of fresh air to the first exhaust passageway, so that the rich shift of air-fuel ratio can be prevented. Therefore, during the lean combustion, too, sufficient exhaust energy can be supplied to the turbocharger, so that sufficient charging pressure can be obtained.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 2A is a diagram showing exhaust valve control regions during the stoichiometric combustion mode in Embodiment 1 of the invention;

FIG. 2B is a diagram showing exhaust valve control regions during the lean combustion mode in Embodiment 1 of the invention;

FIG. 3A is a diagram showing opening characteristics of exhaust valves Ex1, Ex2 in a region 1 shown in FIGS. 2A and 2B;

FIG. 3B is a diagram showing opening characteristics of the exhaust valves Ex1, Ex2 in a region 2 shown in FIGS. 2A and 2B;

FIG. 3C is a diagram showing opening characteristics of the exhaust valves Ex1, Ex2 in a region 3 shown in FIGS. 2A and 2B;

FIG. 6A is a diagram showing the exhaust valve control regions in the case where during the lean combustion mode, catalyst bed temperatures Tp, Tnox are greater than or equal to reference values in Embodiment 2 of the invention;

FIG. 6B is a diagram showing the exhaust valve control region in the case during the lean combustion mode, the catalyst bed temperatures Tp, Tnox are less than the reference values in Embodiment 2 of the invention;

DETAILED DESCRIPTION OF THE EMBODIMENTS

Figure 1:
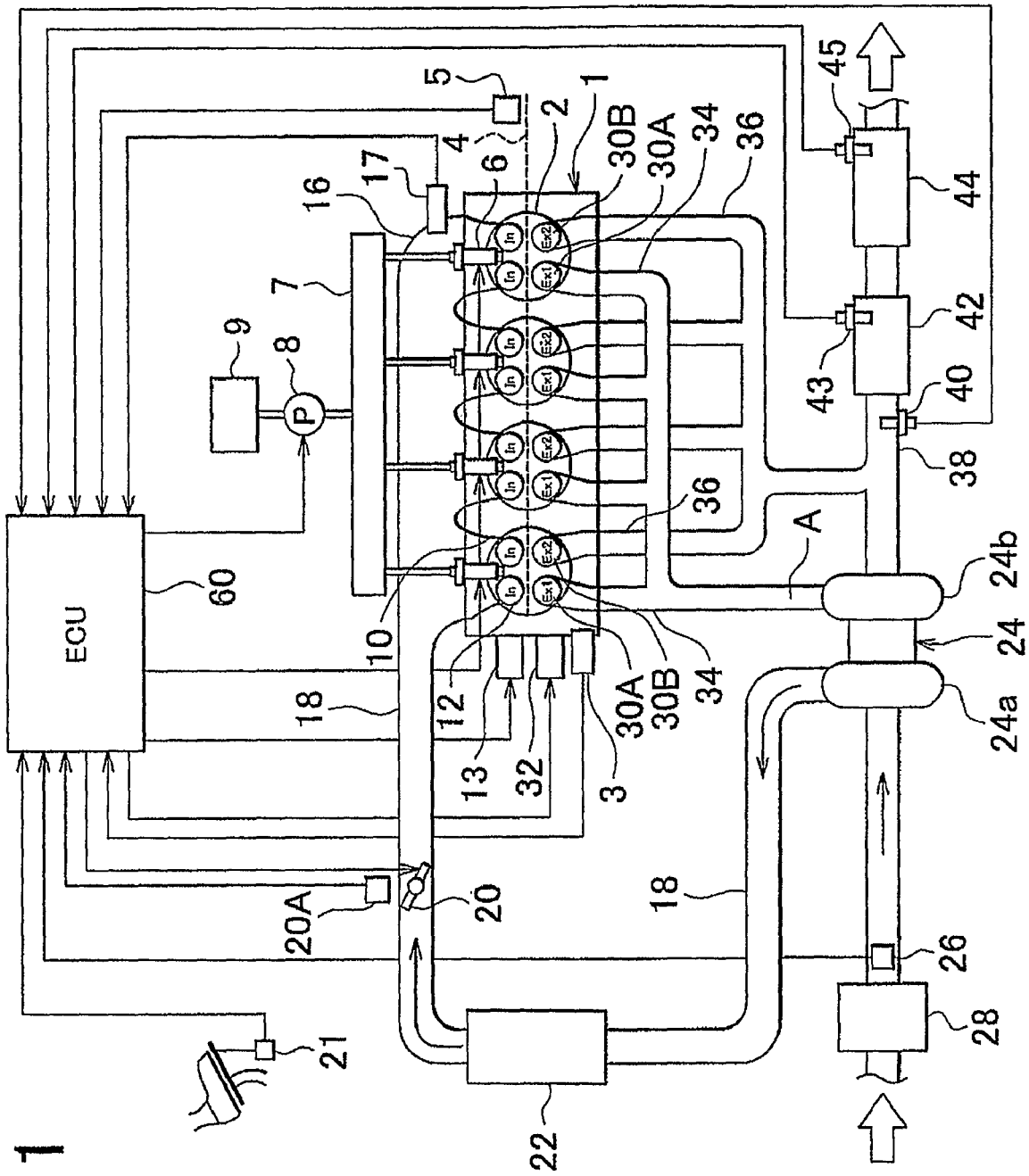
FIG. 1 is a diagram showing a system construction according to Embodiment 1 of the invention.

Hereinafter, embodiments of the invention will be described with reference to the drawings. Elements and the like common between the drawings are assigned with the same reference numerals, and redundant descriptions thereof are omitted.

Embodiment 1

[Description of System Construction]

FIG. 1 is a system construction according to Embodiment 1 of the invention. The system in this embodiment is an independent exhaust type engine system that has a turbocharger.

The system shown in FIG. 1 includes an engine 1 that has a plurality of cylinders 2. Pistons of the cylinders 2 are each connected to a common crankshaft 4 via a crank mechanism. Near the crankshaft 4, a crank angle sensor 5 is provided. The crank angle sensor 5 is constructed so as to detect the rotation angle of the crankshaft 4 (hereinafter, referred to as "crank angle CA").

The engine 1 has injectors 6 corresponding to the individual cylinders 2. The injectors 6 are constructed so as to directly inject high-pressure fuel into the cylinders 2. The injectors 6 are connected to a common delivery pipe 7. The delivery pipe 7 is connected to communicate with a fuel tank 9 via a fuel pump 8.

Besides, the engine 1 has a plurality of intake ports 10 corresponding to the individual cylinder 2. Each intake port 10 is provided with an intake valve 12 (which will sometimes be designated with reference characters "In"). The intake valves 12 are connected with a variable valve mechanism 13 changing the opening characteristics of the intake valves 12 (the open-close timing and the lift amount thereof) independently from each other. The variable valve mechanism 13 used herein may be a known electromagnetically driven valve mechanism, a mechanical or hydraulic type variable valve mechanism, etc.

The intake ports 10 are connected to an intake manifold 16. The intake manifold 16 is provided with a charging pressure sensor 17. The charging pressure sensor 17 is constructed so as to measure the pressure of the air that is supercharged by a below-described compressor 24a (hereinafter, referred to as "supercharged air"), that is, the charging pressure PIM.

An intake passageway 18 is connected to the intake manifold 16. An intermediate portion of the intake passageway 18 is provided with a throttle valve 20. The throttle valve 20 is an electronically controlled valve that is driven by a throttle motor (not shown). The throttle valve 20 is driven on the basis of the accelerator operation amount AA detected by an accelerator operation amount sensor 21. A throttle opening degree sensor 20A is provided near the throttle valve 20. The throttle opening degree sensor 20A is constructed so as to detect the degree of throttle opening TA.

An intercooler 22 is provided upstream of the throttle valve 20. The intercooler 22 is constructed so as to cool the supercharged air.

A compressor 24a of a turbocharger 24 is provided upstream of the intercooler 22. The compressor 24a is linked to a turbine 24b via a link shaft (not shown). The turbine 24b is provided in a first exhaust passageway 34 described below. The turbine 24b is rotationally driven by exhaust dynamic pressure (exhaust energy) so that the compressor 24a is rotationally driven.

An air flow meter 26 is provided upstream of the compressor 24a. The air flow meter 26 is constructed so as to detect the intake air amount Ga. An air cleaner 28 is provided upstream of the air flow meter 26. An upstream side of the air cleaner 28 is open to the atmosphere.

The engine 1 has a first exhaust valve 30A (which will sometimes be designated with reference characters "Ex1") and a second exhaust valve 30B (which will sometimes be designated with reference characters "Ex2") for each cylinder 2. The first exhaust valve 30A opens and closes a first exhaust passageway 34 that leads to the turbine 24b. The turbine 24b is constructed so as to be rotationally driven by the dynamic pressure of exhaust gas passing through the first exhaust passageway 34. The second exhaust valve 30B is opens and closes a second exhaust passageway 36 that does not lead to the turbine 24b but leads to a downstream side of the turbine 24b.

The exhaust valves 30A, 30B are connected with a variable valve mechanism 32 changing the opening characteristics of the exhaust valves 30A, 30B (the open-close timing and the lift amount thereof) independently of each other. As is the case with the variable valve mechanism 13, the variable valve mechanism 32 used herein may be a known electromagnetically driven valve mechanism, a mechanical or hydraulic type variable valve mechanism, etc.

An exhaust passageway 38 downstream of a meeting point between the first exhaust passageway 34 and the second exhaust passageway 36 is provided with an air-fuel ratio sensor 40 that detects the exhaust air-fuel ratio. A pre-catalyst 42 for purifying exhaust gas is provided downstream of the air-fuel ratio sensor 40. The pre-catalyst 42 can be constructed of, for example, a three-way catalyst. The pre-catalyst 42 is provided with a pre-catalyst bed temperature sensor 43 that detects the catalyst bed temperature Tp of the pre-catalyst 42.

A NOx catalyst 44 is provided downstream of the pre-catalyst 42. The NOx catalyst 44 can be constructed of, for example, NOx storage reduction catalyst. The NOx catalyst 44 has a function of storing NOx from exhaust gas during the lean combustion, and reducing and thus releasing the stored NOx in an atmosphere in which the air-fuel ratio is less than or equal to the stoichiometric air-fuel ratio, that is, in a fuel-rich atmosphere in which the air-fuel ratio is less than or equal to the stoichiometric air-fuel ratio. The NOx catalyst 44 may be a catalyst that has only the function of storing and reducing NOx, or may also be a DPNR (Diesel Particulate-NOx Reduction system) that has the function of trapping soot in exhaust gas as well as the storage-reduction function. The NOx catalyst 44 is provided with a NOx catalyst bed temperature sensor 45 that detects the catalyst bed temperature Tnox of the NOx catalyst 44.

The system of Embodiment 1 includes an ECU (Electronic Control Unit) 60 that is a control device. An input side of the ECU 60 is connected to the crank angle sensor 5, the charging pressure sensor 17, the throttle opening degree sensor 20A, the accelerator operation amount sensor 21, the air flow meter 26, the air-fuel ratio sensor 40, the pre-catalyst bed temperature sensor 43, the NOx catalyst bed temperature sensor 45, etc. An output side of the ECU 60 is connected to the injectors 6, the fuel pump 8, the variable valve mechanisms 13, 32, etc. The ECU 60 calculates the engine rotation speed NE [rpm] on the basis of the crank angle CA. The ECU 60 also calculates the engine load KL [%] on the basis of the intake air amount Ga, the charging pressure PIM, etc. Besides, the ECU 60 estimates the amount of NOx stored in the NOx catalyst 42 on the basis of the engine operation condition, etc. When the estimated amount of stored NOx becomes greater than or equal to a predetermined value, the ECU 60 carries out a so-called rich spike control in order to reduce and release the NOx.

[Features of Embodiment 1]

The foregoing system controls the opening characteristics of the exhaust valves Ex1, Ex2 independently from each other by controlling the variable valve mechanism 32. The control regions of the exhaust valves Ex1, Ex2 are divided into three regions as shown in FIGS. 2A and 2B.

FIGS. 2A and 2B are diagrams showing the control regions of the exhaust valves Ex1, Ex2 (hereinafter, referred to as "exhaust valve control regions") in Embodiment 1. More specifically, FIG. 2A shows the exhaust valve control regions during the stoichiometric combustion, and FIG. 2B shows the exhaust valve control regions during the lean combustion. Besides, FIGS. 3A, 3B and 3C are diagrams showing the opening characteristics of the exhaust valves Ex1, Ex2 in the exhaust valve control regions shown in FIGS. 2A and 2B. More specifically, FIG. 3A shows the exhaust valve opening characteristics in the region 1, and FIG. 3B shows the exhaust valve opening characteristics in the region 2, and FIG. 3C shows the exhaust valve opening characteristics in the region 3.

As shown in FIGS. 2A and 2B, in the case where the engine rotation speed NE is less than a predetermined value NE1 and the engine load KL is less than a predetermined value KL1, it is determined that the exhaust valve control region is the region 1. In the region 1, since the supercharge efficiency is relatively low, the charging pressure PIM does not rise dramatically even if the entire amount of exhaust gas is supplied to the turbine 24b of the turbocharger 24. Therefore, in the region 1, only the second exhaust valve Ex2 of each cylinder is opened as shown in FIG. 3A. As a result, the entire amount of exhaust gas is directly introduced into the pre-catalyst 42 without passing through the turbine 24b of the turbocharger 24. Hence, the decline of the catalyst bed temperatures Tp, Tnox can be prevented.

In the case where the engine rotation speed NE is less than a predetermined value NE3 and the engine load KL is greater than a predetermined value KL3, it is determined that the exhaust valve control region is the region 3. In the region 3, only the first exhaust valve Ex1 of each cylinder is opened as shown in FIG. 3C. As a result, the entire amount of exhaust gas is introduced into the turbine 24b of the turbocharger 24.

In the case where it is determined that the exhaust valve control region is the region 2, both the first exhaust valve Ex1 and the second exhaust valve Ex2 of each cylinder are opened as shown in FIG. 3B. As a result, a portion of the exhaust gas is supplied to the turbine 24b, and the rest of the exhaust gas is directly supplied to the pre-catalyst 42 without passing through the turbine 24b.

It is to be noted herein that as shown in FIGS. 2A and 2B, if the engine rotation speed NE is less than the predetermined value NE3, the region 1, the region 2 and the region 3 are defined in that order with the increasing engine load KL. If the exhaust gas control region is switched from the region 1 immediately to the region 3, the amount of exhaust gas that is supplied to the pre-catalyst 42 without passing through the turbine 24b becomes zero. In consequence, there is a possibility of sharp decline of the catalyst bed temperature Tp of the pre-catalyst 42. Besides, it is preferable to operate the turbocharger 24 to some degree prior to the full operation of the turbocharger 24 in the region 3, in terms of heightening the response of the turbocharger 24. Therefore, the region 2 in which the exhaust valves Ex1, Ex2 are both opened is provided between the region 1 and the region 3.

During the lean combustion, the exhaust gas temperature becomes lower than during the stoichiometric combustion. Therefore, during the lean combustion, there is a possibility of deterioration of the response of the turbocharger 24 and therefore insufficiency of the charging pressure.

As a countermeasure against this, in Embodiment 1, the predetermined value KL1LEAN of the engine load for the time of the lean combustion is set lower than the predetermined value KL1STOICHI for the time of the stoichiometric combustion as shown in FIGS. 2A and 2B. That is, during the lean combustion, the region in which the exhaust valve Ex1 starts to be operated is expanded to the low load side, as compared with during the stoichiometric combustion. Thus, during the lean combustion, exhaust energy is given to the turbine 24b at a lower load side than during the stoichiometric combustion. Hence, even during the lean combustion, the response of the turbocharger 24 can be heightened, so that sufficient charging pressure can be obtained.

Besides, in Embodiment 1, the predetermined value KL3LEAN of the engine load for the time of the lean combustion is set lower than the predetermined value KL3STOICHI for the time of the stoichiometric combustion. That is, during the lean combustion, the region in which the entire amount of exhaust gas is supplied to the turbine 24b is expanded to a low load side, as compared with during the stoichiometric combustion. Thus, during the lean combustion, the entire amount of exhaust gas is supplied to the turbine 24b at a lower load side than during the stoichiometric combustion. Hence, during the lean combustion, too, the response of the turbocharger 24 can be heightened, so that sufficient charging pressure can be obtained.

Besides, in Embodiment 1, during the rich spike control, the predetermined values (NE1LEAN, and the like) for the time of the lean combustion are used. Incidentally, it is an ordinary practice that, during the rich spike control, the predetermined values (NE1STOICHI, and the like) for the time of the stoichiometric combustion are used to perform the exhaust valve control. In this practice, however, at the time of switch from the lean combustion to the rich spike control, the changing of the exhaust valve control region will likely increase the torque shock, heightening the possibility of deterioration of drivability. In Embodiment 1, in contrast to the ordinary practice, during the rich spike control, the predetermined values (NE1LEAN, and the like) for the time of the lean combustion are used, as described above. Hence, when the rich spike control begins, the exhaust valve control performed during the lean combustion continues to be performed. This can prevent occurrence of a torque shock, and can prevent deterioration of drivability.

[Concrete Processes in Embodiment 1]

Figure 4:
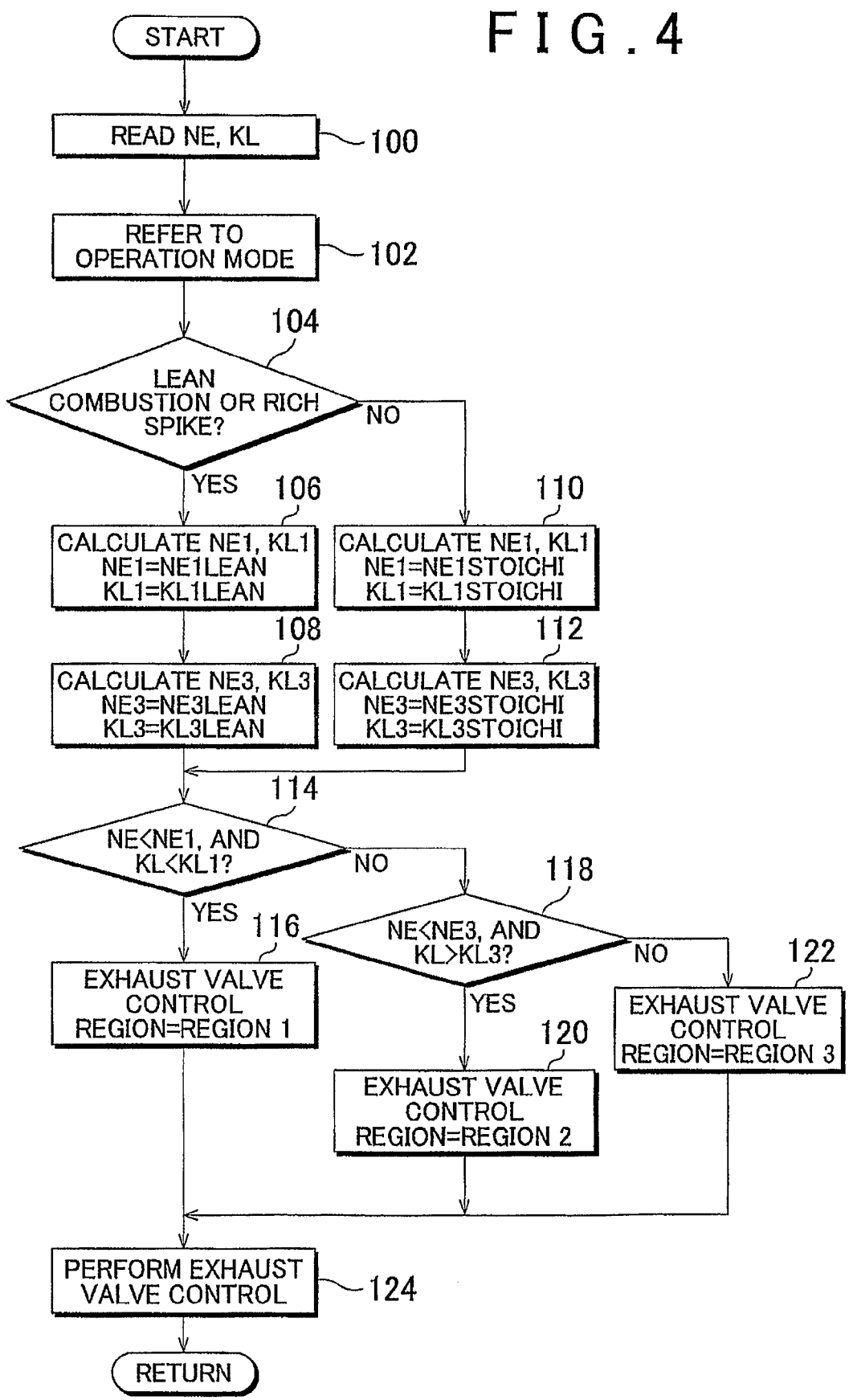
FIG. 4 is a flowchart showing a routine that an ECU 60 executes in Embodiment 1 of the invention.

FIG. 4 is a flowchart showing a process that the ECU 60 executes in Embodiment 1. This process is started at a predetermined timing before the exhaust valves Ex1, Ex2 are driven. According to the process shown in FIG. 4, the engine rotation speed NE and the engine load KL are firstly read (step 100). Subsequently, the engine operation mode is referred to on the basis of the engine rotation speed NE and the engine load KL read in step 100 (step 102). It is to be noted herein that, in a process other than the present process, one of the stoichiometric combustion and the lean combustion is determined as the engine operation mode to be executed, on the basis of the engine rotation speed NE and the engine load KL. In the foregoing step 102, the thus-determined engine operation mode is referred to.

After that, it is determined whether or not the engine operation mode referred to in step 102 is the lean combustion or the rich spike control is being executed (step 104). If in step 104 it is determined that the present engine operation mode is the lean combustion or that the rich spike control is being executed, the predetermined value NE1 for use for the determination regarding the region 1 is calculated to be NE1LEAN, and the predetermined value KL1 for the same use is calculated to be KL1LEAN (step 106). Furthermore, the predetermined value NE3 for use for the determination regarding the region 3 is calculated to be NE3LEAN, and the predetermined value KL3 for the same use is calculated to be KL3LEAN (step 108).

On the other hand, if in step 104 it is determined that the present engine operation mode is the stoichiometric combustion, the predetermined value NE1 for use for the determination regarding the region 1 is calculated to be NE1STOICHI, and the predetermined value KL1 for the same use is calculated to be KL1STOICHI (step 110). Furthermore, the predetermined value NE3 for use for the determination regarding the region 3 is calculated to be NE3STOICHI, and the predetermined value KL3 for the same use is calculated to be KL3STOICHI (step 112).

After the process of step 108 or 112, it is determined whether or not the engine rotation speed NE read in step 100 is less than the predetermined value NE1 and the engine load KL read in step 100 is less than the predetermined value KL1 (step 114). If in step 114 it is determined that the engine rotation speed NE is less than the predetermined value NE1 and the engine load KL is less than the predetermined value KL1, it is then determined that the exhaust valve control region is the region 1 (step 116).

On the other hand, if in step 114 it is determined that the engine rotation speed NE is greater than or equal to the predetermined value NE1 or that the engine load KL is greater than or equal to the predetermined value KL1, the process proceeds to step 118. In step 118, it is determined whether or not the engine rotation speed NE is less than the predetermined value NE3 and the engine load KL is greater than the predetermined value KL3. If in step 118 it is determined that the engine rotation speed NE is less than the predetermined value NE3 and the engine load KL is greater than the predetermined value KL3, it is then determined that the exhaust valve control region is the region 3 (step 120).

On the other hand, if in step 118 it is determined that the engine rotation speed NE is greater than or equal to the predetermined value NE3 or that the engine load KL is less than or equal to the predetermined value KL3, it is then determined that the exhaust valve control region is the region 2 (step 122).

After the process of step 116, 120 or 122, the exhaust valve control according to the determined exhaust valve control region is carried out (step 124). In step 124, a drive request to the variable valve mechanism 32 changing the opening characteristics of the exhaust valves Ex1, Ex2 is output. After that, this process is ended.

Incidentally, although in Embodiment 1, the predetermined value KL3LEAN is set between the predetermined value KL3STOICHI and the predetermined value KL1STOICHI as shown in FIGS. 2A and 2B, the predetermined value KL3LEAN may also be set lower than the predetermined value KL1STOICHI depending on the vehicle type, and the like.

Figure 5:
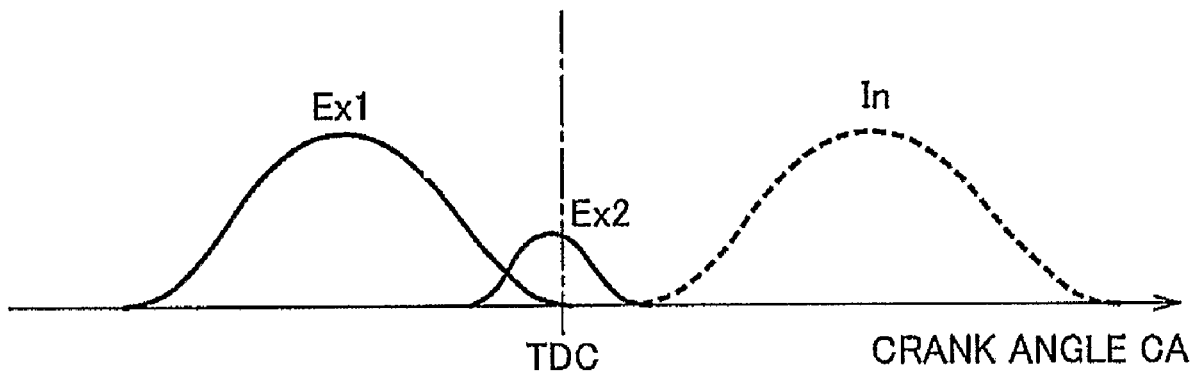
FIG. 5 is a diagram exhaust valve opening characteristics in the region 2 in a modification of Embodiment 1 of the invention.

Furthermore, although in Embodiment 1, the opening characteristics of the two (first and second) exhaust valves Ex1, Ex2 are the same in the region 2 (see FIG. 3B), the opening characteristics of the exhaust valves Ex1, Ex2 may be different from each other as shown in FIG. 5. FIG. 5 is a diagram showing the exhaust valve opening characteristics in the region 2 in accordance with a modification of Embodiment 1. As shown in FIG. 5, after the first exhaust valve Ex1 is opened, the second exhaust valve Ex2 is opened. In that case, the first exhaust valve Ex1 is opened at a timing at which the piston speed is the greatest (i.e., during an intermediate period of the stroke). As a result, exhaust gas can be efficiently supplied to the turbine 24b of the first exhaust passageway 34, so that the work done by the turbocharger 24 can be increased.

Besides, although in Embodiment 1, the predetermined values KL1LEAN, KL3LEAN for the time of the lean combustion are set lower by the same amount of difference than the predetermined values KL1STOICHI, KL3STOICHI for the time of the stoichiometric combustion, the amount of difference between KL1STOICHI and KL1LEAN and the amount of difference between KL3STOICHI and KL3LEAN may be different from each other.

Besides, although in Embodiment 1, the predetermined values NE1LEAN, NE3LEAN set for the time of the lean combustion are the same as the predetermined values NE1STOICHI, NE3STOICHI set for the time of the stoichiometric combustion, they may also be different from each other.

In Embodiment 1 and the modifications, the engine 1 can be regarded as an "internal combustion engine" in the invention, and the turbocharger 24 can be regarded as a "turbocharger" in the invention, and the turbine 24b can be regarded as a "turbine" in the invention, and the first exhaust passageway 34 can be regarded as a "first exhaust passageway" in the invention, and the second exhaust passageway 36 can be regarded as a "second exhaust passageway" in the invention. Besides, in Embodiment 1 and the modifications, the first exhaust valve Ex1 (30A) can be regarded as a "first exhaust valve" in the invention, and the second exhaust valve Ex2 (30B) can be regarded as a "second exhaust valve" in the invention, and the intake valve In (12) can be regarded as an "intake valve" in the invention, and the pre-catalyst 42 and the NOx catalyst 44 can be regarded as a "catalyst" in the invention, and the pre-catalyst bed temperature sensor 43 and the NOx catalyst bed temperature sensor 45 can be regarded as a "catalyst bed temperature acquisition device" in the invention. Besides, in Embodiment 1 and the modifications, the ECU 60 functions as an "engine load acquisition device" in the invention by executing the process of step 100, and also functions as a "control portion" in the invention by executing the processes of steps 106, 108 and steps 114 to 124.

Embodiment 2

Next, Embodiment 2 of the invention will be described with reference to FIGS. 6A, 6B and 7. A system in Embodiment 2 can be realized by using a hardware construction shown in FIG. 1 and by the ECU 60 executing a below-described process shown in FIG. 7.

[Features of Embodiment 2]

In Embodiment 1, the predetermined values KL1LEAN, KL3LEAN for the time of lean combustion are set lower than the predetermined values KL1STOICHI, KL3STOICHI for the time of stoichiometric combustion. As a result, even during the lean combustion, the response of the turbocharger 24 can be improved so that sufficient charging pressure NM can be obtained.

As described above, during the lean combustion, the temperature of exhaust gas becomes lower than during the stoichiometric combustion. Hence, if the first exhaust valve Ex1 is opened at early timing, the catalyst bed temperatures Tp, Tnox may sometimes sharply decline. Consequently, there is possibility of the exhaust emission characteristic deteriorating while sufficient charging pressure PIM is obtained.

As a countermeasure against this, in Embodiment 2, in the case where during the lean combustion, and the catalyst bed temperatures Tp, Tnox are lower than reference values, the predetermined values KL1, KL3 are set higher than in the case where during the lean combustion, and the catalyst bed temperatures Tp, Tnox are higher than or equal to the reference values, as shown in FIGS. 6A and 6B. It is to be noted herein that the predetermined values KL1, KL3 in Embodiment 2 satisfy the requirements adopted in Embodiment 1.

FIGS. 6A and 6B are diagrams showing exhaust valve control regions during the lean combustion in Embodiment 2. More specifically, FIG. 6A shows the control regions of the exhaust valves Ex1, Ex2 in the case where the catalyst bed temperatures Tp, Tnox are higher than or equal to the reference values, and FIG. 6B shows the control regions of the exhaust valves Ex1, Ex2 in the case where the catalyst bed temperatures Tp, Tnox are less than the reference values. In addition, FIG. 6A shows the same diagram as FIG. 2B.

In Embodiment 2, the predetermined value KL1LEANL for the case where the engine operation mode is the lean combustion and the catalyst bed temperatures Tp, Tnox are less than the reference values as shown in FIG. 6B is set higher than the predetermined value KL1LEAN for the case where the engine operation mode is the lean combustion and the catalyst bed temperatures Tp, Tnox are higher than or equal to the reference values as shown in FIG. 6A. That is, during the lean combustion, the region in which the exhaust valve Ex1 starts to be operated in the case where the catalyst bed temperatures Tp, Tnox are less than the reference values is set to a higher load side than that in the case where the catalyst bed temperatures Tp, Tnox are higher than or equal to the reference values. As a result, in the case where the catalyst bed temperatures Tp, Tnox are less than the reference values, the direct supply of the entire amount of exhaust gas to the pre-catalyst 42 without passage through the turbine 24b is performed in a region of load up to a higher value than in the case where the catalyst bed temperatures Tp, Tnox are higher than or equal to the reference values. Hence, even in the case where the engine operation mode is the lean combustion and the catalyst bed temperatures Tp, Tnox are less than the reference values, the decline of the catalyst bed temperatures Tp, Tnox can be restrained, so that the deterioration in the exhaust emission characteristics can be prevented.

Besides, in Embodiment 2, the predetermined value KL3LEANL for the case where the engine operation mode is the lean combustion and the catalyst bed temperatures Tp, Tnox are less than the reference values as shown in FIG. 6B is set higher than the predetermined value KL3LEAN for the case where the engine operation mode is the lean combustion and the catalyst bed temperatures Tp, Tnox are higher than or equal to the reference values as shown in FIG. 6A. That is, the region in which only the exhaust valve Ex1 of each cylinder is operated in the case where the engine operation mode is the lean combustion and the catalyst bed temperatures Tp, Tnox are less than the reference values is set to a higher load side than that in the case where the engine operation mode is the lean combustion and the catalyst bed temperatures Tp, Tnox are higher than or equal to the reference values. As a result, in the case where the catalyst bed temperatures Tp, Tnox are less than the reference values, the direct supply of a portion of the exhaust gas to the pre-catalyst 42 without passage through the turbine 24b is performed in a region of load up to a higher value than in the case where the catalyst bed temperatures Tp, Tnox are higher than or equal to the reference values. Hence, even in the case where the engine operation mode is the lean combustion and the catalyst bed temperatures Tp, Tnox are less than the reference values, sufficient charging pressure PIM can be obtained, and the deterioration in exhaust emission characteristics can be prevented.

Incidentally, the predetermined value KL3LEANL is set lower than a maximum load KLmax that allows the lean combustion to be realized when supercharge is not provided, as shown in FIG. 6B. Hence, the entire amount of exhaust gas is supplied to the turbine 24b before the load reaches the maximum load KLmax that allows the lean combustion to be realized during the non-supercharge state.

[Concrete Processes in Embodiment 2]

Figure 7:
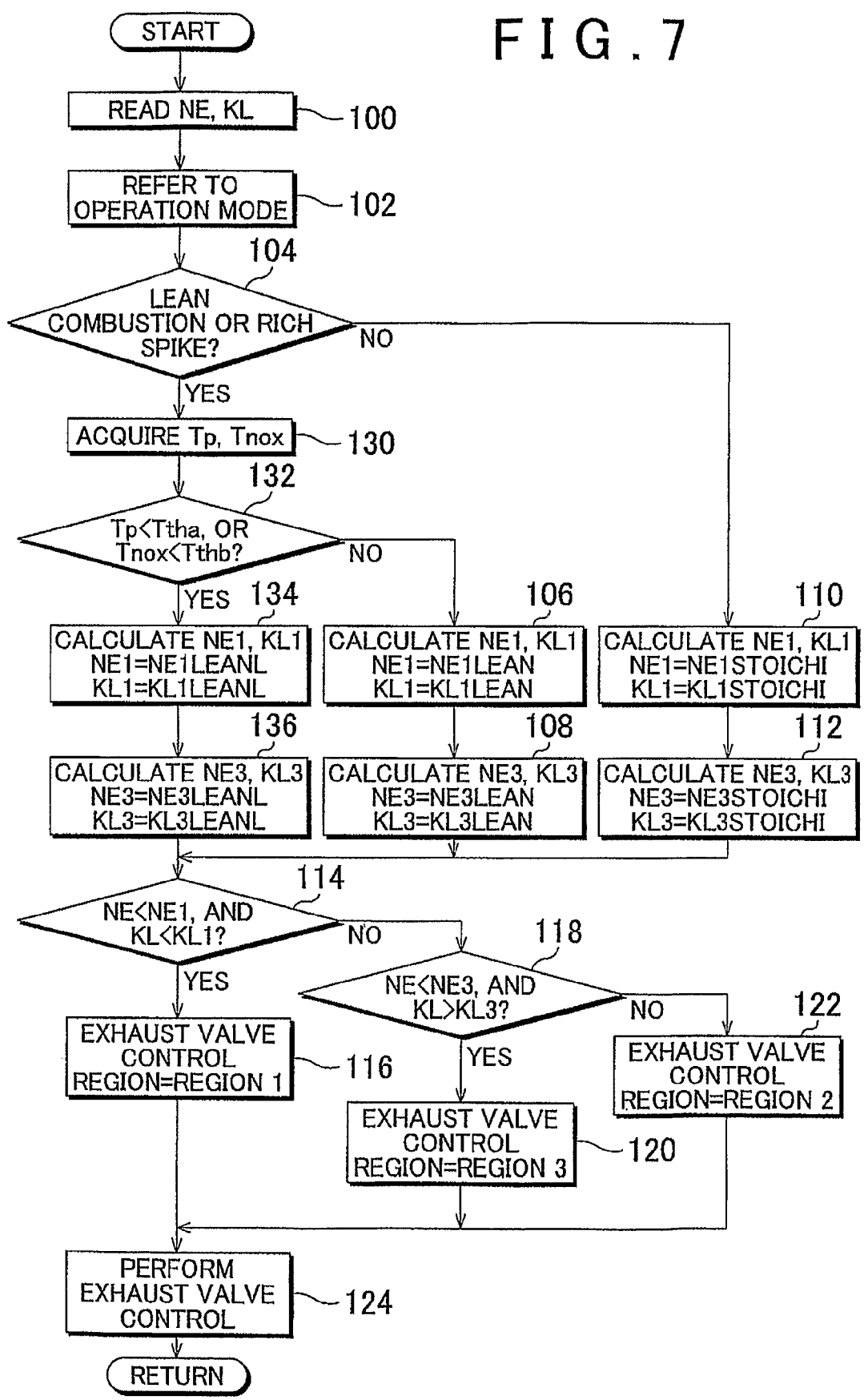
FIG. 7 is a flowchart showing a routine that the ECU 60 executes in Embodiment 2 of the invention.

FIG. 7 is a flowchart showing a process that the ECU 60 executes in Embodiment 2. This process is started at a predetermined timing before the exhaust valves Ex1, Ex2 are driven.

According to the process shown in FIG. 7, the process of steps 100 to 104 is firstly executed as in the process shown in FIG. 4. if in step 104 it is determined that the present engine operation mode is the stoichiometric combustion; NE1=NE1STOICHI and KL1=KL1STOICHI are calculated (step 110) as in the process shown in FIG. 4. After that, NE3=NE3STOICHI and KL3=KL3STOICHI are calculated (step 112).

On the other hand, if in step 104 it is determined that the present engine operation mode is the lean combustion or the rich spike control is being executed, the ECU 60 acquires the pre-catalyst bed temperature Tp and the NOx catalyst bed temperature Tnox (step 130), unlike the process shown in FIG. 4. After that, it is determined whether or not the pre-catalyst bed temperature Tp acquired in step 130 is less than a reference value Tha or the NOx catalyst bed temperature Tnox acquired in step 130 is less than a reference value Thb (step 132). The reference value Tha herein is, for example, 450° C., and the reference value Thb is, for example, 300° C. If in step 132 it is determined that the pre-catalyst bed temperature Tp is higher than or equal to the reference value Tha and the NOx catalyst bed temperature Tnox is higher than or equal to the reference value Thb, NE1=NE1LEAN and KL1=KL1LEAN are calculated (step 106). After that, NE3=NE3LEAN and KL3=KL3LEAN are calculated (step 108).

If in step 132 it is determined that the pre-catalyst bed temperature Tp is less than the reference value Tha or that the NOx catalyst bed temperature Tnox is less than the reference value Thb, NE1=NE1LEANL and KL1=KL1LEANL are calculated (step 134). After that, NE3=NE3LEANL and KL3=KL3LEANL are calculated (step 136). As described above, the values KL1LEANL and KL3LEANL calculated in steps 134, 136 are higher than the values KL1LEAN and KL3LEAN calculated in steps 106, 108. Therefore, the regions 1, 3 are each expanded to the higher load side.

After the process of step 108, 112 or 136, the exhaust valve control region is determined by executing the process of steps 114 to 120 as hi the process shown in FIG. 4. After that, the exhaust valve control according to the thus-determined exhaust valve control region is carried out (step 124). After that, the process is ended.

Although in Embodiment 2, the bed temperature sensors 43, 45 are used to detect the catalyst bed temperatures Tp, Tnox, the catalyst bed temperatures Tp, Tnox may also be estimated on the basis of the engine operation state (KL, NE). In that case, in step 130 in the process shown in FIG. 7, the estimated catalyst bed temperatures Tp, Tnox are read.

In Embodiment 2, the ECU 60 functions as a "control portion" in the invention by executing the processes of steps 134 and 136.

Embodiment 3

Next, Embodiment 3 of the invention will be described with reference to FIGS. 8 to 11. A system of Embodiment 3 can be realized by using a hardware construction shown in FIG. 1 and by the ECU 60 executing a below-described process shown in FIG. 11.

[Features of Embodiment 3]

Figure 8:
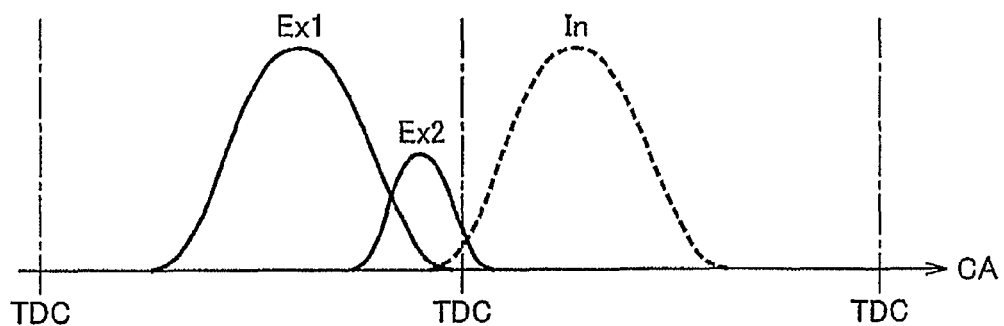
FIG. 8 is a diagram showing an example of the opening characteristics of the exhaust valves Ex1, Ex2 and an intake valve In in the case where the blow-through of fresh air occurs.

According to the system shown in FIG. 1, the provision of an amount of valve overlap between the exhaust valves Ex1, Ex2 and the intake valves In, for example, as shown in FIG. 8 causes fresh air to be blown through into the exhaust system (scavenging). FIG. 8 is a diagram showing an example of the opening characteristics of the exhaust valves Ex1, Ex2 and the intake valves In in the case where the blow-through of fresh air occurs, During the lean combustion, the work done by the turbocharger 24 becomes less than during the stoichiometric combustion, if the amount of air during the lean combustion is equal to that during the stoichiometric combustion. Hence, during the lean combustion, it is desirable to take more air into the cylinders.

However, if the aforementioned air blow-through occurs, the amount of air confined in each cylinder decreases. Furthermore, since the amount of fuel injection is calculated on the basis of the intake air amount Ga detected by the air flow meter 26, the scavenging brings about a rich shift of the air-fuel ratio. Therefore, the exhaust energy supplied to the turbine 24b decreases, as compared with the case where the air blow-through does not occur.

Figure 9:
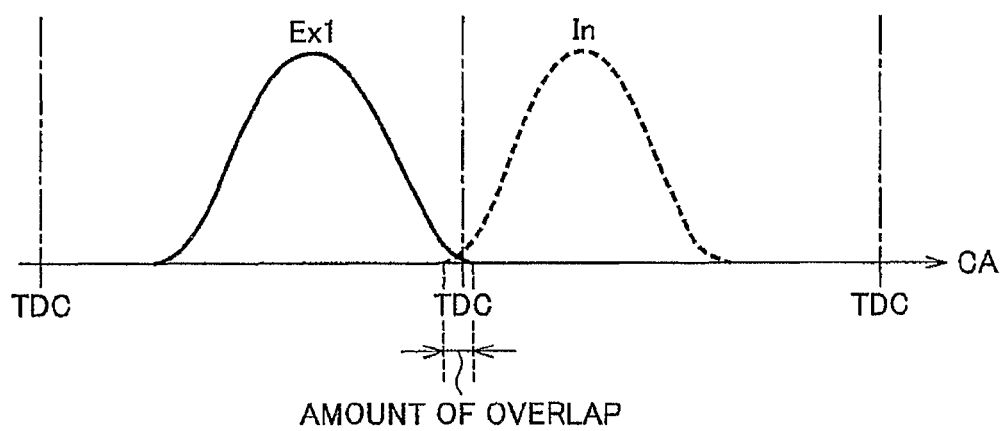
FIG. 9 is a diagram showing an example of the opening characteristics of the exhaust valves Ex1, Ex2 and the intake valve In during an ordinary lean combustion mode in Embodiment 3 of the invention.

As a countermeasure against this, in Embodiment 3, during ordinary lean combustion, the second exhaust valve Ex2 is brought to rest, and only the first exhaust valve Ex1 is operated, as shown in FIG. 9. FIG. 9 is a diagram showing an example of the opening characteristics of the exhaust valves Ex1, Ex2 and the intake valves In during the ordinary lean combustion in Embodiment 3. By operating only the first exhaust valve Ex1, the entire amount of exhaust gas can be supplied to the turbine 24b. Furthermore, as shown in FIG. 9, the overlap period between the first exhaust valve Ex1 and the intake valves In is set at zero or set at or below a predetermined value. This can restrain the air blow-through, and can restrain the rich shift of the air-fuel ratio. Hence, sufficient exhaust energy can be supplied to the turbine 24b, so that sufficient charging pressure PIM can be obtained.

Figure 10:
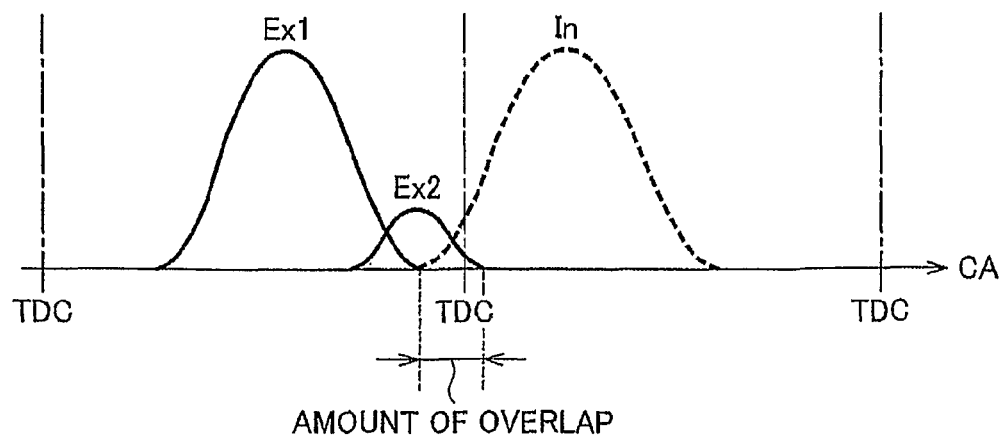
FIG. 10 is a diagram showing an example of the opening characteristics of the exhaust valves Ex1, Ex2 and the intake valve In in the case where the catalyst bed temperatures Tp, Tnox are less than the reference values in Embodiment 3 of the invention.

Furthermore, in the case where the catalyst bed temperatures Tp, Tnox are less than the reference value, the amount of overlap between the second exhaust valve Ex2 and the intake valves In is set greater than or equal to a predetermined value as shown in FIG. 10. FIG. 10 is a diagram showing an example of the opening characteristics of the exhaust valves Ex1, Ex2 and the intake valves In in the case where the catalyst bed temperatures Tp, Tnox are less than the reference values in Embodiment 3. This setting of the overlap amount results in the air blow-through and therefore a rich shift of the air-fuel ratio. Then, while the exhaust energy given to the turbine 24b decreases, the unburned fuel and the blown-through fresh air can be reacted on the pre-catalyst 42 or the NOx catalyst 44, so that the catalyst bed temperatures Tp, Tnox can be raised.

In the example shown in FIG. 10, after the first exhaust valve Ex1 is opened, the second exhaust valve Ex2 is opened. In that case, the first exhaust valve Ex1 is opened at a timing at which the piston speed is the greatest (i.e., during an intermediate period of the stroke). As a result, exhaust gas can be efficiently supplied to the turbine 24b of the first exhaust passageway 34, so that the work done by the turbocharger 24 can be increased.

Besides, there are cases where the catalyst bed temperatures Tp, Tnox need to be further raised, such as the case where the catalyst bed temperatures Tp, Tnox are less than a second reference values that are lower than the reference values, or the case where the temperature rise caused by the aforementioned reaction between the unburned fuel and the fresh air is not sufficient. hi those cases, in Embodiment 3, the fuel injection is performed during the expansion stroke. As a result, an increased amount of unburned fuel is supplied to the pre-catalyst 42, so that the reaction between the unburned fuel and fresh air can be further accelerated on the pre-catalyst 42.

[Concrete Processes of Embodiment 3]

Figure 11:
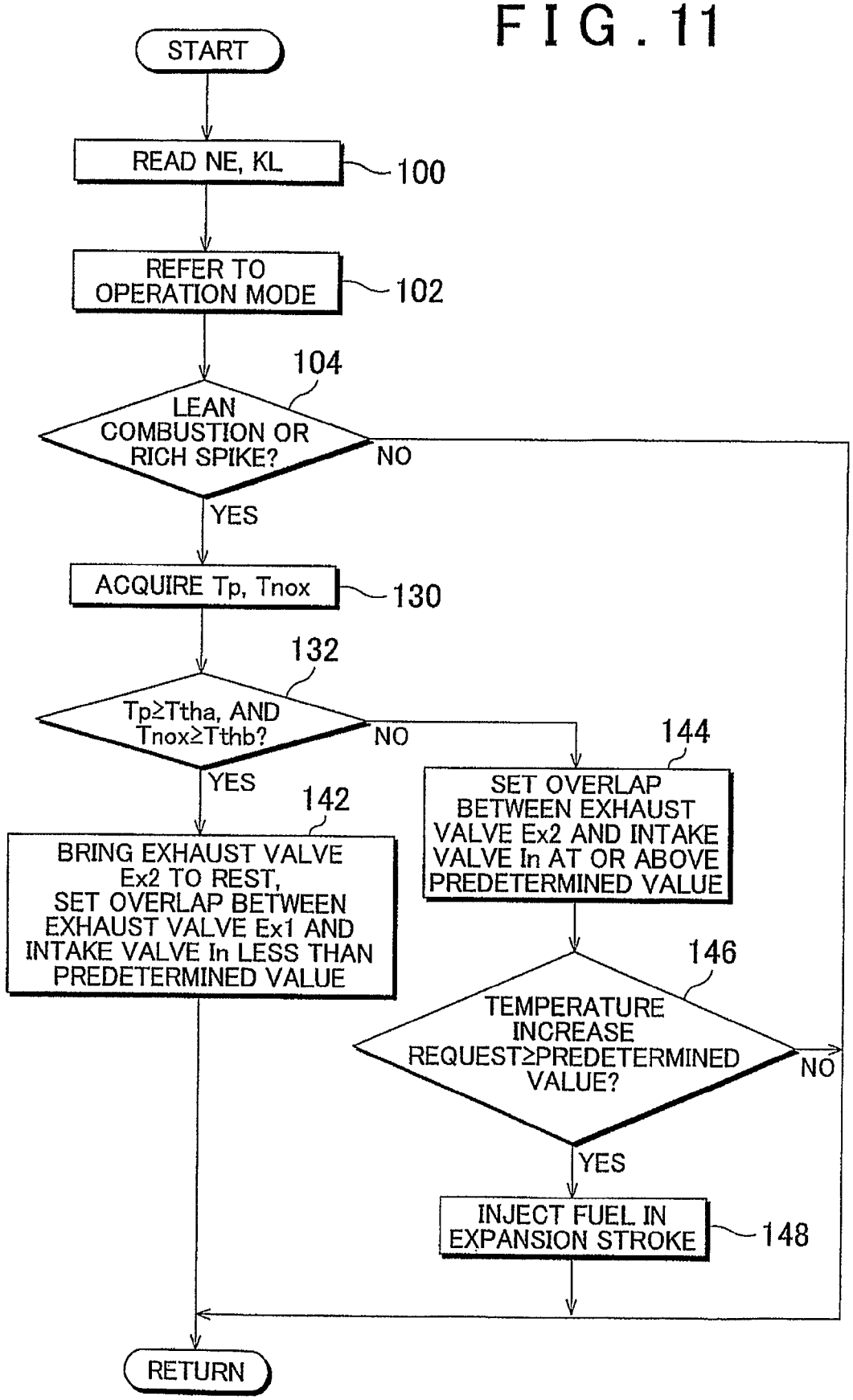
FIG. 11 is a flowchart showing a routine that the ECU 60 executes in Embodiment 3 of the invention.

FIG. 11 is a flowchart showing a process that the ECU 60 executes in Embodiment 3. This process is started at a predetermined timing before the exhaust valves Ex1, Ex2 are driven.

According to the process shown in FIG. 11, the engine rotation speed NE and the engine load KL are read (step 100), and the engine operation mode is referred to (step 102), as in the process shown in FIG. 4. After that, it is determined whether or not the engine operation mode referred to in step 102 is the lean combustion (step 140). If in step 140 it is determined that the present engine operation mode is the stoichiometric combustion, the process is ended.

On the other hand, if in step 140 it is determined that the engine operation mode is the lean combustion, the pre-catalyst bed temperature Tp and the NOx catalyst bed temperature Tnox are acquired (step 130), as in the routine shown in FIG. 6. After that, it is determined whether or not the pre-catalyst bed temperature Tp acquired in step 130 is less than a reference value Ttha or the NOx catalyst bed temperature Tnox is less than a reference value Tthb (step 132).

If in step 132 it is determined that the pre-catalyst bed temperature Tp greater than or equal to the reference value Ttha and the NOx catalyst bed temperature Tnox is greater than or equal to the reference value Tthb, for example, the exhaust valve Ex2 is brought to rest and the amount of overlap between the exhaust valve Ex1 and the intake valve In is set less than or equal to a predetermined value (step 142), as in the example shown in FIG. 9. In step 142, a drive request to a variable valve mechanism 32 which is capable changing the opening characteristics of the exhaust valves Ex1, Ex2, and a drive request to a variable valve mechanism 13 changing the opening characteristics of the intake valve In are output. After that, the process is ended.

On the other hand, if in step 132 it is determined that the pre-catalyst bed temperature Tp is less than the reference value Ttha or that the NOx catalyst bed temperature Tnox is less than the reference value Tthb, it is determined that there is a need to raise the catalyst bed temperatures Tp, Tnox. In this case, for example, the amount of overlap between the second exhaust valve Ex2 and the intake valve In is set greater than or equal to a predetermined value (step 144), as in the example shown in FIG. 10. In step 144, a drive request to the variable valve mechanisms 13, 32 is output.

After that, it is determined that a request value for increasing the catalyst bed temperatures Tp, Tnox is greater than or equal to a predetermined value (step 146). In step 146, it is determined that the temperature increase request is greater than or equal to the predetermined value, in the case where the catalyst bed temperatures Tp, Tnox are less than second reference values Ttha2, Tthb2 that are lower than the reference values Ttha, Tthb, respectively, or in the case where the answer to the determination in step 132 is "NO" again despite the execution of process of step 144 during the previous process. In such a case, the fuel injection is performed during the expansion stroke (step 148). After that, the present execution of this process is ended.

Figure 12:
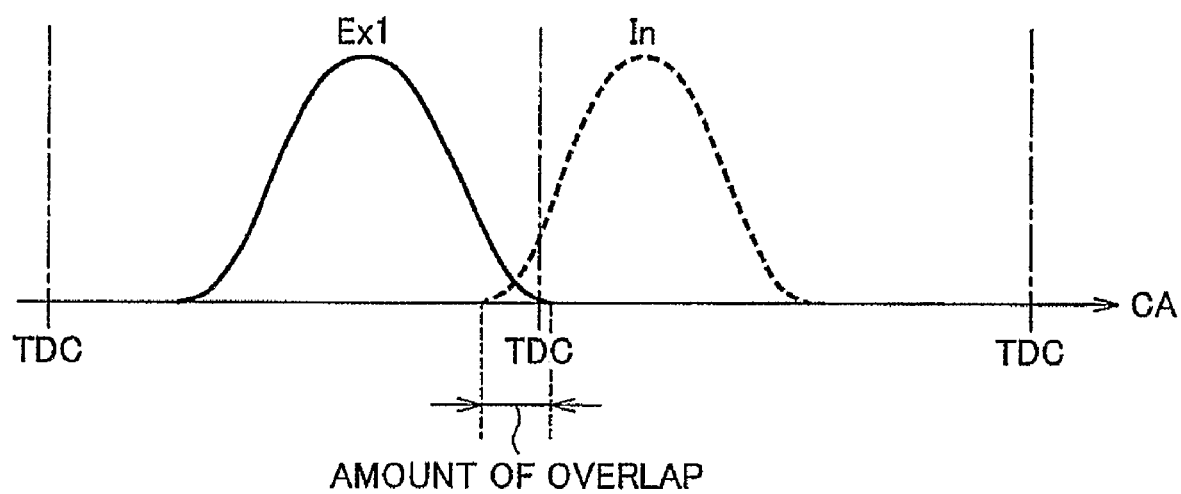
FIG. 12 is a diagram showing the opening characteristics of the exhaust valve Ex1 and the intake valve In in Embodiment 3 of the invention.

Although in Embodiment 3, the amount of overlap between the second exhaust valve Ex2 and the intake valves In is set greater than or equal to the predetermined value in order to cause the blow-through of fresh air in step 148, the amount of overlap between the first exhaust valve Ex1 and the intake valves In may also be the predetermined value, as in the example shown in FIG. 12. FIG. 12 is a diagram showing the opening characteristics of the exhaust valve Ex1 and the intake valves In in a modification of Embodiment 3. In this modification, too, the blow-through of fresh air can be caused.

Besides, although in Embodiment 3, the catalyst bed temperatures Tp, Tnox are detected by using the bed temperature sensors 43, 45, the catalyst bed temperatures Tp, Tnox may also be estimated on the basis of the engine operation state (KL, NE). In that case, in step 130 in the process shown in FIG. 11, estimated catalyst bed temperatures Tp, Tnox are read.

Incidentally, in Embodiment 3 and the modification thereof, the ECU 60 functions as a "catalyst bed temperature acquisition device" in the invention by executing the process of step 130, and also functions as a "control portion" in the invention by executing the processes of steps 142, 144 and 148.

The invention claimed is:

1. An internal combustion engine control device comprising:
   a turbocharger provided on an internal combustion engine;
   a first exhaust valve that opens and closes an exhaust port that communicates with a first exhaust passageway on which a turbine of the turbocharger is provided;
   a second exhaust valve that opens and closes an exhaust port that communicates with a second exhaust passageway that bypasses the turbine;
   a catalyst disposed at a downstream side of a meeting point of the first exhaust passageway and the second exhaust passageway;
   an engine load acquisition device that acquires an engine load; and
   a control portion that opens only the second exhaust valve when the engine load is less than a first predetermined value, and that opens both the first and second exhaust valves when the engine load is greater than or equal to the first predetermined value and less than a second predetermined value, and that opens only the first exhaust valve when the engine load is greater than or equal to the second predetermined value,
   wherein the control portion sets the first predetermined value to be lower during a lean combustion than during a stoichiometric combustion.

2. The internal combustion engine control device according to claim 1, wherein
   during the lean combustion, the control portion sets the second predetermined value to be lower than during the stoichiometric combustion.

3. The internal combustion engine control device according to claim 1, wherein
   when the lean combustion is being performed and a catalyst bed temperature is less than a reference value, the control portion sets the first predetermined value to be higher than when the lean combustion is being performed and the catalyst bed temperature is greater than or equal to the reference value.

4. The internal combustion engine control device according to claim 1, wherein
   when the lean combustion is being performed and the catalyst bed temperature is less than a reference value, the control portion sets the second predetermined value to be higher than when the lean combustion is being performed and the catalyst bed temperature is greater than or equal to the reference value.

5. The internal combustion engine control device according to claim 1, wherein
   when both the first and second exhaust valves are to be opened, the control portion opens the first exhaust valve and then opens the second exhaust valve.

6. An internal combustion engine control device comprising:
   a turbocharger provided on an internal combustion engine;
   a first exhaust valve that opens and closes an exhaust port that communicates with a first exhaust passageway on which a turbine of the turbocharger is provided;
   a second exhaust valve that opens and closes an exhaust port that communicates with a second exhaust passageway that bypasses the turbine;
   a catalyst disposed at a downstream side of a meeting point of the first exhaust passageway and the second exhaust passageway; and
   a control portion that, during a lean combustion, brings the second exhaust valve to rest in a closed state, and sets an amount of valve overlap between the first exhaust valve and an intake valve to be less than a predetermined value.

7. The internal combustion engine control device according to claim 6, further comprising:
   a catalyst bed temperature acquisition device that acquires a bed temperature of the catalyst, wherein the control portion brings the second exhaust valve to rest in the closed state, and sets the amount of overlap between the first exhaust valve and the intake valve to be less than the predetermined value, when the lean combustion is being performed and the catalyst bed temperature is greater than or equal to a reference value.

8. The internal combustion engine control device according to claim 7, wherein
   the control portion sets the amount of overlap between the first or second exhaust valve and the intake valve to be greater than or equal to the predetermined value, when the lean combustion is being performed and the catalyst bed temperature is less than the reference value.

9. The internal combustion engine control device according to claim 8, wherein
   the control portion injects fuel during an expansion stroke of the internal combustion engine, when the lean combustion is being performed and the catalyst bed temperature is less than the reference value, and a request value for increasing the catalyst bed temperature is greater than or equal to a predetermined value.

10. The internal combustion engine control device according to claim 9, wherein
    the control portion determines that the request value is greater than or equal to the predetermined value, when the catalyst bed temperature is less than a second reference value that is lower than the reference value, or when it has been determined consecutively at least a predetermined number of times that the catalyst bed temperature is less than the reference value.

11. The internal combustion engine control device according to claim 8, wherein
    when both the first and second exhaust valves are to be opened, the control portion opens the first exhaust valve, and then opens the second exhaust valve.

12. The internal combustion engine control device according to claim 1, wherein
    during a stoichiometric control, the control portion performs substantially the same control as during the lean combustion.

13. A control method for an internal combustion engine that includes a turbocharger, a first exhaust valve that opens and closes an exhaust port that communicates with a first exhaust passageway on which a turbine of the turbocharger is provided, a second exhaust valve that opens and closes an exhaust port that communicates with a second exhaust passageway that bypasses the turbine, and a catalyst disposed at a downstream side of a meeting point of the first exhaust passageway and the second exhaust passageway, the control method comprising:
    setting a first region that is an operation region of the internal combustion engine in which only the second exhaust valve is opened, a second region that is an operation region of the internal combustion engine in which both the first and second exhaust valves are opened, and a third region that is an operation region of the internal combustion engine in which only the first exhaust valve is opened;

calculating an engine rotation speed and an engine load;

determining whether or not a lean combustion is being performed based on the engine rotation speed and the engine load; and setting a first predetermined value that is an upper-limit value of the first region or both the first predetermined value and a second predetermined value that is an upper-limit value of the second region to be lower when it is determined that the internal combustion engine is presently operated in the lean combustion than when it is determined that the internal combustion engine is presently operated in a stoichiometric combustion.

14. The control method according to claim 13, further comprising:

detecting a bed temperature of the catalyst; and setting the first predetermined value or both the first predetermined value and the second predetermined value to be higher when it is determined that the internal combustion engine is presently operated in the lean combustion and the catalyst bed temperature is less than a reference value than when it is determined that the internal combustion engine is presently operated in the lean combustion and the catalyst bed temperature is greater than or equal to the reference value.

15. A control method for an internal combustion engine that includes a turbocharger, a first exhaust valve that opens and closes an exhaust port that communicates with a first exhaust passageway on which a turbine of the turbocharger is provided, a second exhaust valve that opens and closes an exhaust port that communicates with a second exhaust passageway that bypasses the turbine, and a catalyst disposed at a downstream side of a meeting point of the first exhaust passageway and the second exhaust passageway, the control method comprising:

setting a first region that is an operation region of the internal combustion engine in which only the second exhaust valve is opened, a second region that is an operation region of the internal combustion engine in which both the first and second exhaust valves are opened, and a third region that is an operation region of the internal combustion engine in which only the first exhaust valve is opened;

calculating an engine rotation speed and an engine load;

determining whether or not a lean combustion is being performed based on the engine rotation speed and the engine load;

detecting a bed temperature of the catalyst; and bringing the second exhaust valve to rest in a closed state and setting an amount of valve overlap between the first exhaust valve and an intake valve to be less than a predetermined value, when it is determined that the internal combustion engine is presently operated in a lean combustion and the catalyst bed temperature is greater than or equal to a reference value.

16. The control method according to claim 15, further comprising:

setting the amount of overlap between the first or second exhaust valve and the intake valve to be greater than or equal to the predetermined value, when it is determined that the lean combustion is being performed and the catalyst bed temperature is less than the reference value.

17. The internal combustion engine control device according to claim 6, wherein during a stoichiometric control, the control portion performs substantially the same control as during the lean combustion.

* * * * *